US011128755B2

(12) United States Patent
Kumar et al.

(10) Patent No.: US 11,128,755 B2
(45) Date of Patent: Sep. 21, 2021

(54) SHARED CALL STATE FOR RELATED CALLS

(71) Applicant: Microsoft Technology Licensing, LLC, Redmond, WA (US)

(72) Inventors: Namendra Kumar, Redmond, WA (US); Abhilash Chandrasekharan Nair, Bothell, WA (US); Adit Abhay Dalvi, Seattle, WA (US); Pramod Jaisalmeria, Redmond, WA (US); Anand Srinivasan, Kirkland, WA (US); Anuraag Veturi, Seattle, WA (US); Pallavi Mahajan, Redmond, WA (US); Joel Harodi Marquez Catano, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 16/408,297

(22) Filed: May 9, 2019

(65) Prior Publication Data
US 2020/0358905 A1 Nov. 12, 2020

(51) Int. Cl.
*H04M 3/00* (2006.01)
*H04M 3/58* (2006.01)
*H04M 3/51* (2006.01)
*H04M 3/54* (2006.01)

(52) U.S. Cl.
CPC ........... *H04M 3/58* (2013.01); *H04M 3/5141* (2013.01); *H04M 3/541* (2013.01)

(58) Field of Classification Search
CPC ....................................................... H04M 3/58
See application file for complete search history.

(56) References Cited

U.S. PATENT DOCUMENTS

2005/0147086 A1\* 7/2005 Rosenberg .......... H04L 65/1096
370/352

\* cited by examiner

*Primary Examiner* — Rasha S Al Aubaidi
(74) *Attorney, Agent, or Firm* — Workman Nydegger

(57) ABSTRACT

Handling a related call using a shared call state. The computing system establishes a first call between a first entity and a second entity, assigns a user call identifier to the first call. Next, the second entity instructs that a second call between the first entity and a third entity is to be established. The computing system then establishes the second call between the first entity and the third entity, assigns the same user identifier to the second call, such that the first call and the second call are included in a shared call operation. A first global state of the shared call operation is identified based on a status of at least one of the first call and the second call. When the status of at least one of the first call and the second call changes, the global state of the shared call operation changes from the first global state to a second global state.

22 Claims, 9 Drawing Sheets

SHARED CALL STATE FOR RELATED CALLS

BACKGROUND OF THE INVENTION

Multi-line telecall service systems are broadly used in business environments. Such a multi-line business telecall service system differs from an installation of several independent telephones. Business telecall service systems often provide additional features related to call handling. For example, a business telecall service system may allow a receptionist to monitor and answer every call, and then transfer the answered call to a proper party. As another example, an administrative assistant may be able to answer and make calls on their supervisor's behalf, and once the call is established, the administrative assistant can then transfer the call to his/her supervisor.

Modern business telecall service systems may include a computing system or server that allows certain call handling features to be added or modified using software. For example, a telephone exchange or telephone switching system may be installed on a computing system at an organization with multiple internal devices. When two devices inside the organization need to be connected, the telephone switching system may make the connection internally. When an internal device needs to be connected to an external device, it connects to the external public switched telephone network.

For example, when an administrative assistant answers an external call for his/her supervisor, the administrative assistant often first places the call on hold, then makes an internal call to his/her supervisor to let the supervisor know that someone who wants to talk to the supervisor is currently on hold. If the supervisor decides that he/she would like to talk to the person on hold, the administrative assistant may then tell the supervisor which line to pick up. Alternatively, the administrative assistant may replace the on-hold call with the supervisor's phone line.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to handling related individual calls (also called herein "constituent calls") using shared call states to present to the user the appearance of a single operation (also called herein a "shared call operation"). The constituent calls share the same identifier (called herein a "user call identifier"), and the state of the shared call operation (also called herein a "global state") is recorded and shared with each constituent call. This allows the multiple constituent calls to be presented to the user as a single shared call operation, whilst the functionality of this single call operation is enhanced because it is offered by integrating the constituent calls that share their global state.

In accordance with the principles described herein, a computing system may establish a first call between a first entity and a second entity. The first call is assigned a user call identifier. The computing system may then receive an instruction from the second entity to establish a second call between the first entity and a third entity. In response to the instruction, the second call between the first entity and the third entity is established. The second call is then assigned the same user call identifier, the first call and the second call are both included in a shared call operation. Thereafter, a global state of the shared call operation based on a status of at least one of the first call and the second call is identified. When the status of at least one of the first call and the second call changes, the global state of the shared call operation changes automatically.

For example, an administrative assistant may receive a call from a caller who wants to talk to his/her supervisor. The administrative assistant may put the call on hold and then call his/her supervisor and talks to him/her about the caller and the caller's matters. During this period, if the caller hangs up, the administrative assistant and the supervisor may both be notified, and thus, there is no need for the administrative assistant to transfer the previously on-hold call, since the call was already terminated. As another example, if the caller did not hang up, and the administrative assistant successfully transfers the caller to the supervisor, the previous call between the caller and the call park service should be terminated once the call transfer is completed.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
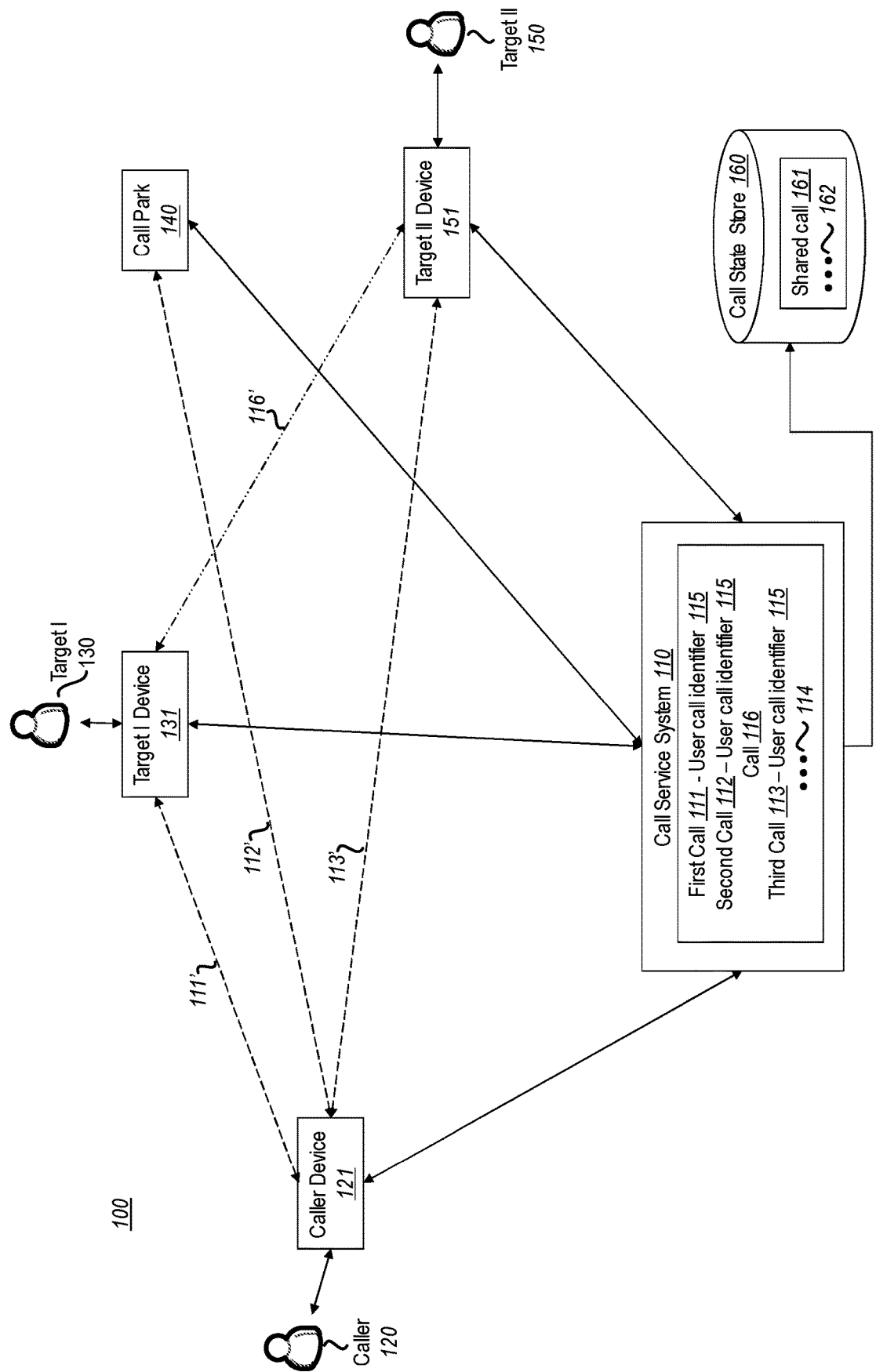
FIG. 1 illustrates an example environment in which the principles described herein may be implemented.

At least some embodiments described herein relate to handling related individual calls (also called herein "constituent calls") using shared call states to present to the user the appearance of a single operation (also called herein a "shared call operation"). The constituent calls share the same identifier (called herein a "user call identifier"), and the state of the shared call operation (also called herein a "global state") is recorded and shared with each constituent call. This allows the multiple constituent calls to be presented to the user as a single shared call operation, whilst the functionality of this single call operation is enhanced because it is offered by integrating the constituent calls that share their global state.

In accordance with the principles described herein, a computing system may establish a first call between a first entity and a second entity. The first call is assigned a user call identifier. The computing system may then receive an instruction from the second entity to establish a second call between the first entity and a third entity. In response to the instruction, the second call between the first entity and the third entity is established. The second call is then assigned the same user call identifier, the first call and the second call are both included in a shared call operation. Thereafter, a global state of the shared call operation based on a status of at least one of the first call and the second call is identified. When the status of at least one of the first call and the second call changes, the global state of the shared call operation changes automatically.

For example, an administrative assistant may receive a call from a caller who wants to talk to his/her supervisor. The administrative assistant may put the call on hold and then call his/her supervisor and talks to him/her about the caller and the caller's matters. During this period, if the caller hangs up, the administrative assistant and the supervisor may both be notified, and thus, there is no need for the administrative assistant to transfer the previously on-hold call, since the call was already terminated. As another example, if the caller did not hang up, and the administrative assistant successfully transfers the caller to the supervisor, the previous call between the caller and the call park service should be terminated once the call transfer is completed.

The principles described herein provide a technical advance to handling related calls (i.e., constituent calls). The related calls are assigned to a shared call state, such that when one call's status changes, the shared call state may change, and other related calls and/or callers are notified of such changes. This solves the problem of existing call service systems, in which a party in one of the related calls often does not know the state of the other related calls and/or devices.

In many situations, two or more calls are related to each other. For example, some phone services provide a feature called "shared call appearance", which allows more than one device to be assigned to one account. In some cases, a person can have a phone at the office, another phone at home, and/or a linked mobile phone, and each of these devices may be able to receive calls that are directed to that same one account. As another example, in a business environment, a business call service system may allow two or more devices to be set up as related devices, such that one device can handle calls directed to another device, and/or one device is capable of transferring calls to another device. When a device handles a call directed to another device, that call is termed a "shared call".

For instance, an assistant's device may be linked to a supervisor's device, such that when a caller calls the supervisor's device, the assistant's device also rings. Alternatively, or in addition, the assistant may make a call from his/her device on behalf of the supervisor's device. Further, if requested by the supervisor, the assistant should be able to pick up a call for the supervisor. After a shared call is established, it can be parked (i.e., transferred to a holding pen or a call park service) by the supervisor or the assistant. Thereafter, the parked call may then be unparked (i.e., retrieved from the holding pen or the call park service) by another user within the logical group.

In existing call service systems, these actions are often represented on the call service system by multiple (and otherwise unrelated) calls. In such an existing call service system, complications may arise during transitional phases where one call may end before the next call (also called herein a "transitional call") is established. For example, when a call is being transferred to the holding pen or call park service, the initial call between the original two users may end before the call between the user and the holding pen is established. These complications are often not handled correctly.

Unlike the traditional call service systems, the principles described herein link these related actions and calls via a user call identifier, such that these calls are viewed by the client systems as one single shared operation, and the members of the group are notified of the status of each of the related calls via the status of the shared call operation. For example, the users of the logical group are notified of each related call status correctly at every point in time even when failure arises. As another example, if a first call is ended prior to the transitional call being fully established, the transitional call state should transit to be ended.

Because the principles described herein may be performed in the context of a call service system, some introductory discussion of a call service system will be described first. Events of individual calls of a call service system can normally be modeled by state machines. For example, before a caller lifts a receiver, the phone is in an "idle state". After the caller lifts the receiver, the dial tone begins, and the phone is in a "dial tone state". After the caller dials the first digit, the dial tone ends, and the phone goes in a "dialing state". The phone will stay in the dialing state, until a valid number of digits is entered. Once a valid number of digits is entered, the phone enters the "ringing state". Once the called phone answers, the phone reaches the "connected state". The phone will remain in the connected state, until the called phone hangs up. When the called phone hangs up, the phone will go to the "disconnected state". When the caller puts the receiver down, the phone goes back to the idle state.

Each of these states is specific to a particular phone device. Traditionally, the state of one phone device and/or one call is often irrelevant to the state of another device and/or call, even when the calls are related calls. The principles described herein improves the call service systems by recording and sharing the global state of the shared call operation with related calls, such that the related calls are notified of each other's status. The global state of the shared call is determined based on a status of at least one of the related (i.e., constituent) calls. The status may be the state of a constituent call and/or other information that is related to the constituent call and/or the device(s) involved in the constituent call.

FIG. 1 illustrates an example environment 100 in which the principles described herein may be implemented. In FIG. 1, there are three parties illustrated including a caller (shown as element 120), the Target I (shown as element 130), and the Target II (shown as element 150). In FIG. 1, the call service system 110 is configured to handle different calls including related calls.

As illustrated in FIG. 1, the caller 120 uses the caller device 121 to make a call intending to reach the Target II device 151. If the Target II is often very busy, the Target I's device 131 may be set up to answer calls directed to the Target II device 151. Thus, when the caller 120 calls the Target II device 151, the Target I device 131 also rings, and the Target I 130 can pick up the call for the Target II 150 from the Target I device 131. This might be helpful, for instance, if the Target I is an assistant working with a phone, and the Target II is a supervisor who might be too busy to answer all calls directed to that supervisor's phone. For instance, an assistant may be set up to be able to answer the calls directed to the supervisor's phone. Thus, when the caller calls the supervisor's phone, the assistant's phone also rings, and the assistant can pick up the call for the supervisor from the assistant's phone, resulting in more productive workflow for the team.

Because this is a common example, the Target I 130 will hereinafter be referred to as the "assistant" or "assistant 130", and the Target II 150 will hereinafter be referred to as the "supervisor" or "supervisor 150". Also, the Target I device 131 may herein after be referred to as the "assistant's device" or "assistant's device 130", and the Target II device 151 may hereinafter be referred to as the "supervisor's device" or "supervisor's device 151." This is merely for ease of reading, and not intended to restrict the scope of the principles described herein.

As illustrated in FIG. 1, when the caller 120 calls the supervisor's device 151, the assistant 130 picks up the caller's call from the assistant's device 131. Once the assistant 130 answers the call, a first call 111 is established in the call service system 110. The dashed arrow 111' linking the caller's device 121 and the assistant's device 131 represents that the first call 111 is between the caller's device 121 and the assistant's device 131. In a real life situation, during the first call 111, the assistant 130 may have a short conversation with the caller 120 to tell the caller 120 that he/she may be put on hold for a few minutes while the assistant 130 tries to find out whether the supervisor 150 is available.

Next, the assistant 130 will place the caller's device 121 on hold. The process of putting the caller's device 121 on hold is often called a call transfer operation, which transfers the first call 111 between the caller's device 121 and the assistant's device 131 to a second call 112 between the caller's device 121 and a call park service 140. Once the second call 112 between the caller's device 121 and the call park service 140 is established in the call service system 110, the call transfer operation is completed. The dashed arrow 112' between the caller device 121 and call park service 140 represents that the second call 112 is between the caller device 121 and the call park service 140.

The caller 120 might likely think the first call 111 and the second call 112 are related calls. Even so, traditional call service systems often deem the first call 111 and the second call 112 as independent calls. Thus, in such a traditional call service system, after the second call 112 is established, the first call 111 may still remain in the system until it is manually terminated, timed out, or terminated for some other reasons.

Unlike the traditional call service systems, the call service system 110 here assigns these related calls a user call identifier 115. Since the first call 111 and the second call 112 are related, each of the first and second calls 111 and 112 are assigned to the same user call identifier 115. The call service system 110 treats the related calls 111 and 112 (i.e., the calls having the same user call identifier 115) as one shared call operation.

A global state of the shared call operation may be determined based on the status of each of the related calls 111 and 112. The status of the related calls 111 and 112 may be as simple as active (e.g., connected) or inactive (e.g., disconnected). Alternatively, or in addition, the status of the related calls 111 and 112 may include (but are not limited to) the above-described individual state of the corresponding call (e.g., dialing state, ringing state, connected state, disconnected state, etc.). Alternatively, or in addition, the status of the related calls 111 and 112 may include status information related to the devices that are involved in the corresponding related call. For example, the first call 111 involves the caller device 121 and the assistant's device 131. Thus, the status of the first call 111 may include status information about the caller device 121 and/or the assistant's device 131. These are just a few examples of how a global state of a shared call operation may be determined. Other methods or information may be used to determine a global state of a shared call.

After the global state 161 of the shared call operation is determined, the global state 161 is then recorded in and shared from a call state store 160. Once the second call 112 is established, the call service system 110 will update the state of the shared call operation, such that the first call 111 may be notified that the second call 112 has been established and thus the first call 111 may terminate itself automatically.

After the assistant 130 puts the caller 120 on hold, the assistant 130 may communicate with the supervisor 150 to find out whether the supervisor 150 would like to talk to the caller 120. The call 116 between the assistant's device 131 and the supervisor's device 151 is then established in the call service system 110. The dash-dotted arrow 116' linking the assistant's device 131 and the supervisor's device 151 represents that the call 116 is between the assistant's device 131 and the supervisor's device 151. Since the call 116's status would not affect the second call 112's status, it is not necessary to join the call 116 into the shared call operation (that includes the first call 111 and the second call 112), and the call 116 is not assigned the same user call identifier 115. The intermitted dash-dotted arrow 116' is also used to differentiate the call 116 from the other related calls (that are represented by dashed arrow 111', 112' and 113'), because the call 116 is not a constituent (i.e., related) call in the shared call operation.

In real life, if the supervisor 150 decides that he/she wants to talk to the caller 120, the supervisor 150 may press a call pick up key on his device (i.e., the supervisor's device 151) to pick up the caller's call. In the call service system 110, this operation is often called "call replacement", which is to replace the second call 112 between the caller device 121 and the call park service 140 with a third call 113 between the caller device 121 and the supervisor's device 151.

In some traditional call service systems, during a call replacement operation, the third call 113 and the second call 112 are also treated as independent calls, just like the first call 111 and the second call 112 were treated as independent calls. Thus, in a situation when the caller 120 becomes impatient and hangs up the on-hold call (i.e., terminates the second call 112) before the third call 113 is established, the supervisor's device 151 may not know about the situation, and may still try to establish the third call 113. In such a situation, complications or errors in the traditional call service system may arise.

Unlike such a traditional call service system, the call service system 110 would assign the third call the same user call identifier 115 as the second call 112. Before, when the third call 113 is being established, the state of the shared call operation 161 is accessed from the call state store 160. If the shared call operation state 161 indicates that the second call 112 has been terminated, the supervisor's device 151 will be notified and the third call 113 will not be established. On the other hand, if the shared call operation state 161 indicates that the second call 112 is still active, the third call 113 will be established.

Once the third call 113 is established, the second call 112 is no longer necessary. However, again, in many traditional call service systems, since the second call 112 and the third call 113 are deemed as independent calls, the second call 112 will remain active unless it is manually terminated, timed out, or terminated for some other reasons. Unlike such a traditional call service system, the call service system 110 records the shared call operation state 161 in the call state store 160 after the third call 113 is established. The shared call state 161 is then shared with the second call 112. Once the second call 112 is notified that the third call 113 has been established successfully, the second call 112 may terminate itself automatically.

The ellipsis 114 in the call service system 110 represents that there may be any number of calls active in the call service system. Some of them may be related and be assigned the same call identifier and joined into a shared call operation, some of them may be independent and not related to any other calls, and/or some of them may be first independent at first but later be joined to a shared call operation. The ellipsis 162 in the call state store 160 represents that there may be any number of shared call operations at the same time. This number changes as new shared call operations establish and some of the existing shared call operation end.

Because the shared call operation's states are to identify a group of related calls, instead of the states of the individual calls, such a shared call operation state (i.e., the global state) is "global" compared to the state of each individual call, and an individual call's state may be referred to as a "local state". The user call identifier 115 may also be referred to as a "global identifier". Also, the call state store 160 that stores the global states may also be called a "global store". The global store may be a cloud storage that is remote to the call service system 110, a storage connected to the call service system 110 via a LAN, and/or a local storage coupled to the call service system 110.

As briefly described above, local states may include (but are not limited to) an "idle state", a "dial tone state", a "dialing state", a "ringing state", a "connected state", and a "disconnected state". Unlike local states, global states are used to define multiple related calls' overall status. Different state machines may be used to implement the global state of the shared call operation. As an example, global states may include (but are not limited to) a "call active state", a "parking state", an "active call ended ending park state", a "park success pending confirmation state", a "parked state", a "park failed pending resurrection state", and an "ended state".

Figure 2:
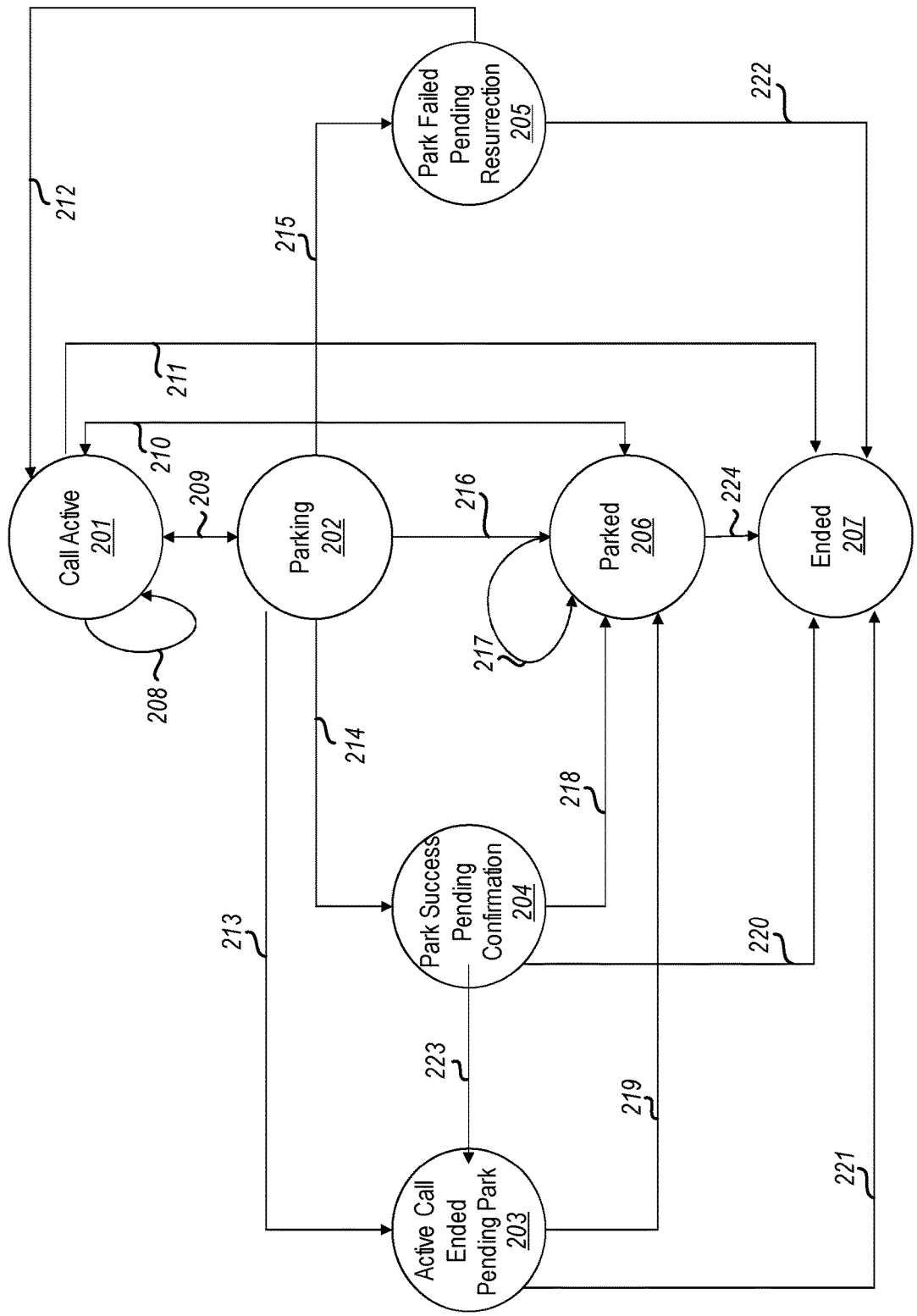
FIG. 2 illustrates a call state diagram including multiple call states that an example call service system may implement.

FIG. 2 illustrates a diagram of example global states that may be implemented in the call service system 110 and the global store 160. Each of the circles 201 through 207 represents a global state. A shared call operation (including multiple related calls) may transit from one state to another. Each of the arrows 208 through 224 represents the direction (s) between two global states that may be changed. Bi-directional arrows represent that the global state may change in either direction from either of the two global states to the other. On the other hand, a one-directional arrow represents that the global state may be changed in one direction from the global state at the tail of the arrow to the global state at the head of the arrow.

As illustrated in FIG. 2, a shared call operation may change its state between the call active state 201 and parking state 202. The bi-directional arrow 209 indicates that the global state may change between the call active state 201 and the parking state 202. Similarly, the bi-directional arrow 210 indicates that the global state may change between the call active state 201 and the parked state 206.

The arrow 211 represents that the global state may change one-directionally from the call active state 201 to the ended state 207. The arrow 212 represents that the global state may change one-directionally from the park failed pending resurrection state 205 to the call active state 201.

Similarly, the one-directional arrows 213 through 216 represent that the global state may change one-directionally from the parking state 202 to each one of the following global states: (1) the active call ended pending park state 203, (2) the park success pending confirmation state 204, (3) the park failed pending resurrection state 205, and (4) the parked state 206. The one-directional arrows 218 and 219 represent that the global state may change one-directionally to the parked state 206 from each of the park success pending confirmation state 204, and the active call ended pending park state 203, respectively. The one-directional arrow 217 represents that a shared call operation in the parked state 206 may remain in the parked state 206. Similarly, the one-directional arrow 208 represents that a shared call operation in the active state 201 may also remain in the active state 201. The arrow 223 represents that the global state may change one-directionally from the park success pending confirmation state 204 to the active call ended pending park state 203. The one-directional arrow 212 represents that the global state may change one-directionally from the park failed pending resurrection state 205 to the call active state 201.

Finally, the one-directional arrows 211, 220-222 and 224 represent that the global state may change one-directionally from many different states (including the call active state 201, the park success pending confirmation state 204, the active call ended pending park state 203, the park failed pending resurrection state 205, and the parked state 206, respectively) to the ended state 207. Note that the ended state 207 is a special state because a shared call operation should never be able to get out of an ended state. Once a shared call operation is determined to be ended, then that call operation may never be allowed to perform any future actions. The primary reason for this is to ensure that there is continuity in user experience. Otherwise, it would look to a user as though a shared call operation is ended and then coming back to life. Thus, the state of a shared call operation can only move from a non-ended state to an ended state, if it is sure that the shared call operation has ended. If there is any ambiguity, the shared call operation should remain in a non-ended state and only move to the ended state after it is known for sure that the shared call operation has ended.

The global state of a shared call operation often changes based on operations related to call routing between multiple devices and/or users. Call routing semantics are often used to describe moving calls from one call to another. These semantics include (but are not limited to) "call transfers" and "call replacements." Call transfer is a protocol used to move a call between one set of two users to another set of two users. The entity initiating a call transfer is called the "transferor". The entity receiving the transfer is called a "transferee". The entity being transferred to is called a "transfer target". For example, as illustrated in FIG. 1, when the assistant 130 put the caller 120 on hold, the first call 111 is transferred to the second call 112. In such a call transfer operation, the assistant 130 is the call transferor, the call park service 140 is the transferee, and the caller 120 is the transfer target.

Call replacement is the protocol used to takeover an existing call by replacing it with a new call. For example, as illustrated in FIG. 1, when the supervisor 150 picks up the caller 120's call, the second call 112 is replaced by the third call 113. The second call 112 was an existing call, and the third call 113 is a new call that replaces the existing call 112.

Figure 3:
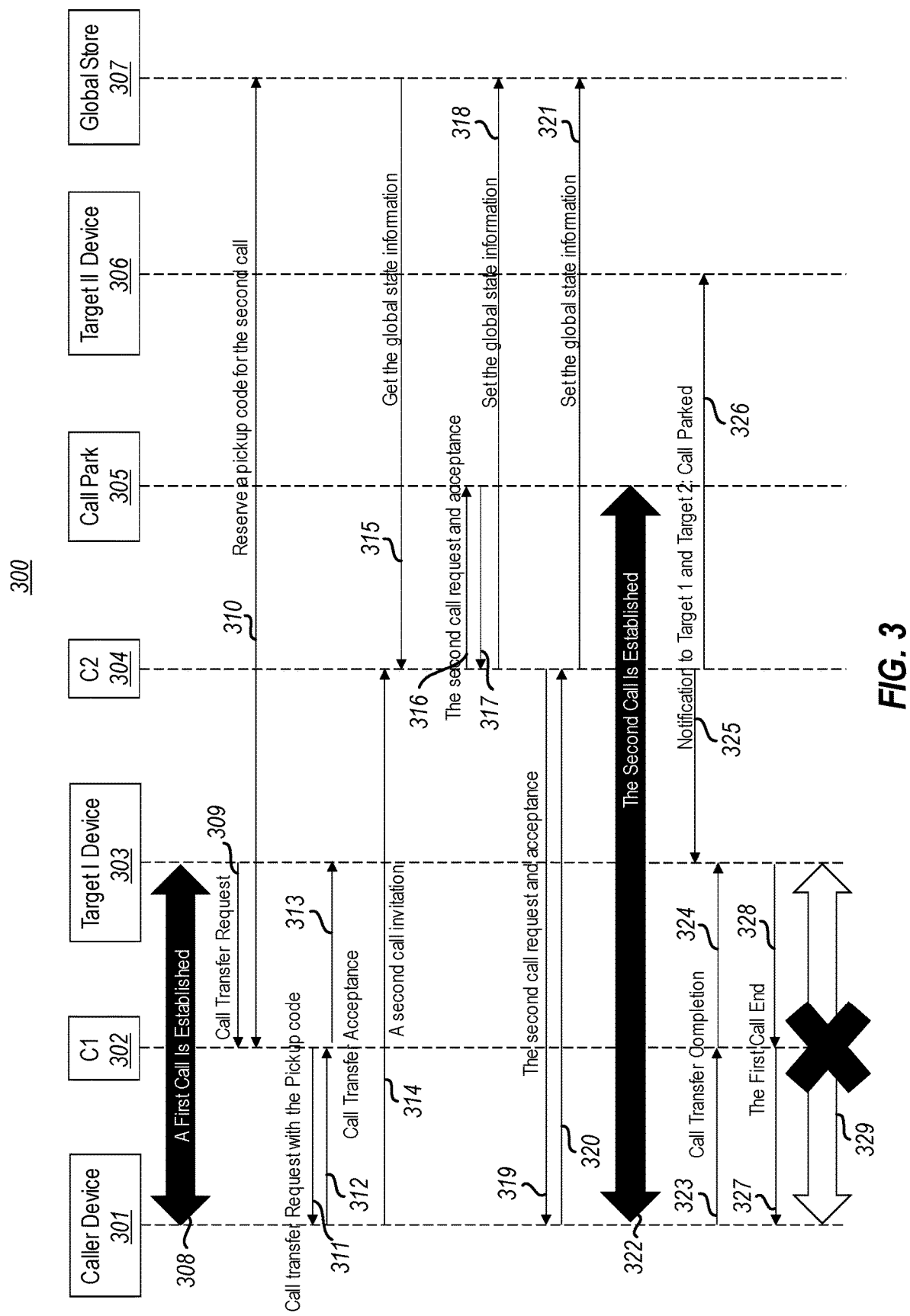
FIG. 3 illustrates a communication diagram for a scenario when a first call between a caller and the Target I is being transferred to a second call between the caller and a call park service.
Figure 4:
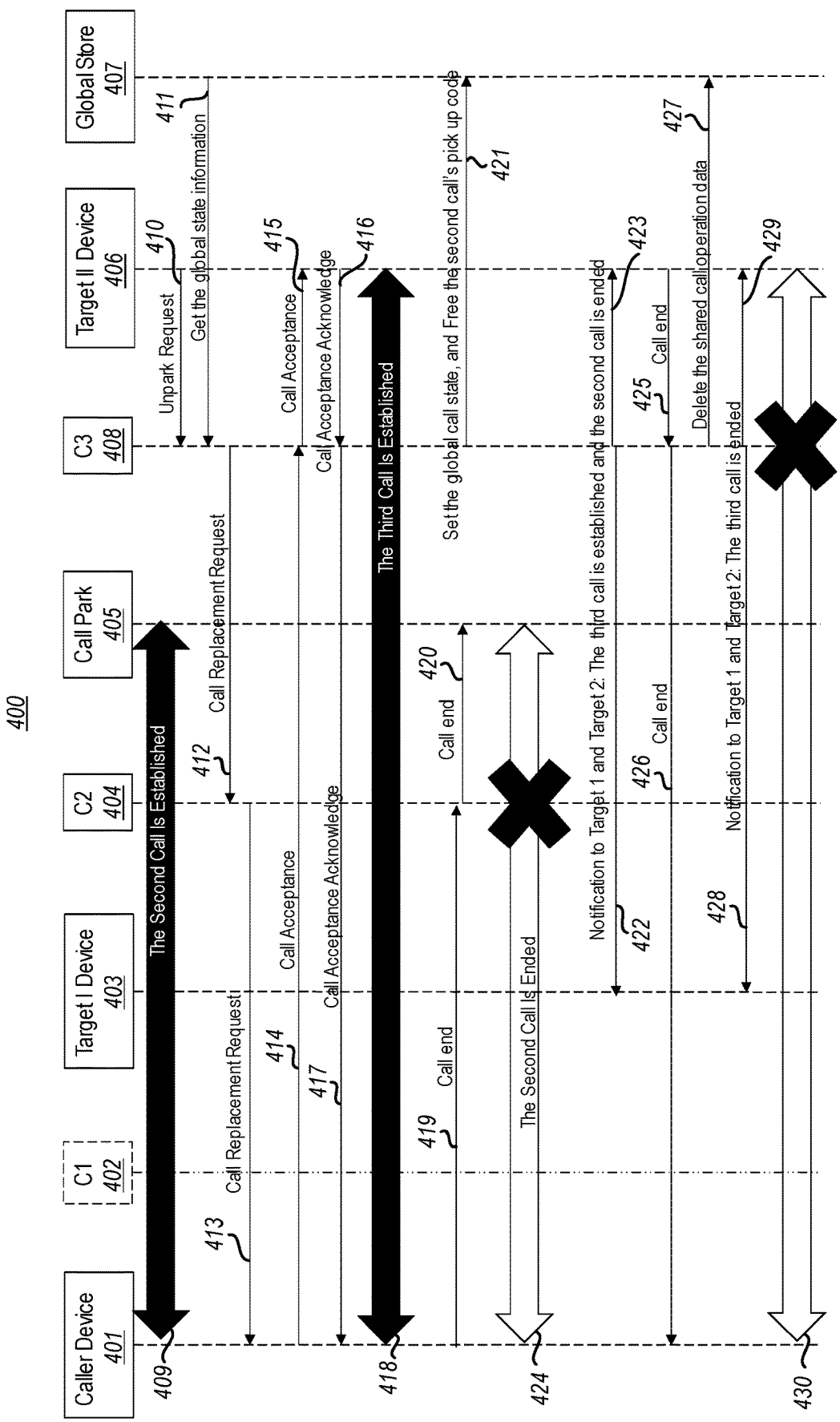
FIG. 4 illustrates a communication diagram for a scenario when the second call between the caller and the call park service is being replaced by a third call between the caller and the Target II.

Further details of call transfer and call replacement operations, and how the global state of the shared call operation transits from one global state to another are illustrated in FIGS. 3 and 4.

FIG. 3 illustrates a communication diagram 300 for a scenario when a first call C1 302 between a caller device 301 and the Target I device 303 is being transferred to a second call C2 304 between the caller device 301 and a call park service 305. Each of the caller device 301, the first call C1 302, the Target I device 303, the second call C2 304, the call park service 305, the Target II device 306, and the global store 307 in FIG. 3 may correspond to the respective caller device 121, first call 111, the assistant's device 131, the second call 112, the call park service 140, the supervisor's device 151, and the call state store 160.

In FIGS. 3 and 4, each of the arrows represents that there is a communication that occurred between the entities linked by the corresponding arrow. The direction of the arrow represents the direction of the communication. The vertical dash lines are similar to time axis that represent the timing at which each of the communications or events may occur. Generally, a communication or event that occurs first is placed above a communication or event that occurs later. Certain communications or events are not dependent on another act being completed prior to the act being performed. In such a case, placing one communication or event on top of another one does not necessarily mean that one communication or event must occur before the other.

As illustrated in FIG. 3, at the beginning, a first call C1 302 between the caller device 301 and the Target I device 303 is established, which is represented by the bi-directional black arrow band 308. Assuming again, the situation is similar to that described with respect to FIG. 1. The caller device 301 may have tried to call the Target II device 306 (e.g., the supervisor's device 151), and the Target I device 303 (e.g., the assistant's device 131) may have picked up the caller's call on behalf of the Target II device 306. Once the Target I device 303 picked up the call, the first call 302 is established, the call service system (e.g., call service system 110) should know that the first call C1 302 is one of the calls in a shared call operation, because multiple devices including the Target I device 303 and the Target II device 306 are involved. Thus, even though there may only be one call established in the shared call operation, the call service system may assign the first call a user call identifier, and the global state of the shared call operation may be identified as the call active state 201 of FIG. 2 and may be recorded in the global store 307.

Next, the assistant 130 uses the Target I device 303 to transfer the first call C1 302 to the call park service 305. In real life, the assistant 130 may press an on-hold button on his/her device to place the caller on hold. However, this operation may involve multiple communications amongst the Target I device 303, the caller device 301, the first call C1 302 and the second call C2 304.

As illustrated in FIG. 3, the Target I device 303 may first initiate a call transfer request, and sends the request to the first call C1 302, which is represented by the one-directional arrow 309. After receiving the call transfer request from the Target I device 303, the first call service 302 contacts the global store 307 to reserve a pick up code for the second call (i.e., the first call 302 receives information from the global store 307). At the same time, the global store 307 may also record a global state of the shared call operation (i.e., the first call 302 sends information to the global store 307). These bi-directional communications between the first call C1 302 and the global store 307 are represented by the bi-directional arrow 310 between the global store 307 and the first call C1 302. At this stage, since the call transfer request has been initiated by the Target I device 303, the global state of the shared call operation may transit from the call active state 201 to the parking state 202. Accordingly, this updated global state (e.g., parking state 202) is received and stored in the global store 307.

After the first call C1 302 receives the pickup code for the second call, it forwards the call transfer request with the pick up code to the caller device 301, which is represented by the one-directional arrow 311. The caller device 301 then accepts the call transfer requests and sends the acceptance to the first call C1 302, which is represented by the one-directional arrow 312. The first call C1 302 then passes the caller device 301's acceptance to the Target I device 303, which is represented by the one-directional arrow 313.

Thereafter, the caller device 301 initiates a second call invitation, which is represented by the one-directional arrow 314. In response, the second call C2 304 contacts the global store 307 to obtain the global state information of the shared call operation, which is represented by the one-directional arrow 315. Since the second call C2 304 knows the global state of the shared operation, it would continue to establish the second call only if the global state indicates that the caller is still online. For example, if the caller is no longer online, the global state of the shared operation will be the ended state 207. In such a situation, it is impossible to establish the second call C2 304 and the second call C2 304 should abort automatically.

Hereinafter, we assume that the second call C2 304 received the global state of the shared call as the parking state 202, which is a valid call state for the second call C2 304 to continue its transactions. The second call C2 304 then sends the second call request to the call park service 305, and the call park service 305 accepts the second call. Each of these steps of the second call request and acceptance is represented by the respective one-directional arrows 316 and 317. At this stage, the global state of the shared operation may transit from the parking state 202 to the park success pending confirmation state 204. Accordingly, the second call C2 304 records the updated shared call state (e.g., park success pending confirmation state 204) in the global store 307, which is represented by the one-directional arrow 318.

Similarly, the second call C2 304 also sends the second call request to the caller device 301 and receives the second call acceptance form the caller device 301, which are represented by the one-directional arrows 319 and 320, respectively. At this moment, since both the caller device 301 and the call park service 305 have received and accepted the second call request, the global state may transit to the parked state 206. The second call C2 304 then records the updated global state (e.g., parked state 206) in the global store 307, which is represented by the one-directional arrow 321. At this point the second call is established, which is represented by the black arrow band 322 with an arrow on both ends.

Next, the caller device 301 may send a call transfer completion notification to the first call C1 302, and the first call C1 302 passes on the call transfer completion notification to the Target I device 303, which are represented by the one-directional arrows 323 and 324. The Target I device 303 then initiates to end the first call C1 302, and the first call C1 301 then notifies the caller device 301 that the first call is ended, which are represented by the one-directional arrows 328 and 327. At substantially the same time, the second call C2 304 also notifies the Target I device 303 and the Target II device 306 that the first call is parked (i.e., in the parked state 206), which are respectively represented by one-directional arrows 325 and 326. Now, the first call is ended, which is represented by the white arrow band and the black cross 329.

As described in FIG. 1, after the caller is put on hold, the supervisor 150 may want to answer the caller 120's call via a call replacement operation, i.e., replacing the second call 112 (between the caller device 121 and the call park service 140) by a third call 113 (between the caller device 121 and the supervisor's device 151).

FIG. 4 illustrates an example communication diagram 400 for a call replacement operation for replacing the second call C2 404 by a third call C3 408. Similarly, comparing FIG. 4 to each of FIGS. 1 and 3, each of the caller device 401, the first call C1 402, the Target I device 403, the second call C2 404, the call park service 405, the Target II device 406, the third call C3 408, and global store 407 in FIG. 4 may corresponds to the respective caller device 121 and 301, the first call 111 and 302, the Target I device 131 and 303, the second call 112 and 304, the call park service 140 and 305, the Target II device 151 and 306, the third call 113, and the call state store 160 and 307.

The call replacement illustrated in FIG. 4 may be an operation that occurs after the call transfer operation illustrated in FIG. 3. Since the first call C1 302 has already ended as of the end of the call transfer operation illustrated in FIG. 3, the first call C1 402 is represented in dotted-line form in FIG. 4. Further, the second call C2 304 was established at the end of the call transfer operation illustrated in FIG. 3. Accordingly, FIG. 4 illustrates that the second call C2 404 (corresponding to the second call C2 304 in FIG. 3) has been established, which is represented by the black bi-directional arrow band 409 pointing between the caller device 401 and the call park service 405.

Here, assume that after the assistant 130 puts the caller 120 on hold (i.e., the second call 112 between the caller 120 and the call park service 140 is established), the supervisor 150 decided to pick up the caller's call. In real life, the supervisor 150 may simply press a call-pick-up button on the Target II's device 406 to pick up the caller's call (i.e., replacing the second call C2 404 by the third call C3 408). In the call service system (e.g., the call service system 110), multiple communications amongst the related devices (e.g., the caller device 401, the Target I device 403, the call park service 405, the Target II device 406, the global store 407, and/or the second and third calls C2 403 and C3 408 in the call service system 110) will occur during the call replacement operation.

As illustrated in FIG. 4, the Target II device 406 may first initiate an unpark request and sends the request to the third call C3 408, which is represented by the one-directional arrow 410. The third call C3 408 also contacts the global store 407 to obtain the global state information of the shared call operation, which is represented by the one-directional arrow 411. As described above in FIG. 3, at the end of the call transfer, the global state of the shared call operation may be the parked state 206. Assuming the global state of the shared call operation has not changed yet, the current global state is still the parked state 206. Accordingly, the third call C3 408 will receive the global state from the global store 407 as the parked state 206. The parked state 206 is a valid global state for an unpark request. Thus, the third call C3 408 passes on the unpark request from the Target II device 406 to the second call C2 404, which is represented by the one-directional arrow 412.

After receiving the call replacement request from the third call C3 408, the second call C2 404 passes on the call replacement request to the caller device 401, which is represented by the one-directional arrow 413. Next, the caller device 401 accepts the call replacement request and sends the acceptance to the third call C3 408, which is represented by the one-directional arrow 414. The third call C3 408 then passes on the call acceptance from the caller 401 to the Target II device 406, which is represented by the one-directional arrow 415. Subsequently, the Target II device 406 acknowledges the call acceptance and sends the acknowledgement to the third call C3 408, which is represented by the one-directional arrow 416. The third call service C3 then passes on the call acceptance acknowledgement to the caller device 401, which is represented by the one-directional arrow 417. After the call requests are accepted by the caller device 401, and the acceptance is acknowledged by the Target II device 406, the third call C3 408 between the caller device 401 and the Target II device 406 is established, which is represented by the black bi-directional arrow band 418.

Once the third call C3 408 is established, the second call C2 404 is no longer needed. Thus, the caller device 401 sends a call end request to the second call C2 404, which is represented by the one-directional arrow 409. Once the second call C2 404 receives the call end request from the caller device 401, the second call C2 404 ends the second call and notifies the call park service 405 that the second call 403 is ended, which is represented by the one-directional arrow 420. At this point, the global state of the shared call operation may be changed from the parked state 206 to the active state 201. Thus, the third call C3 408 records the updated global state (e.g., the active state 201) in the global store 407, and since the second call C2 404 has ended, the second call's pick up code can also be freed from the global store 407. These communications are represented by the one-directional arrow 421. The arrow band and the black cross 424 represents that the second call is ended.

Subsequently, or substantially at the same time, the third call C3 408 also notifies the Target I device 403 and the Target II device 406 that the third call C3 408 has been established and that the second call C2 404 has been ended, which are represented by the one-directional arrows 422 and 423. At this point, the call replacement operation replacing the second call C2 404 (between the caller device 401 and the call park service 405) by the third call C3 408 (between the caller device 401 and the Target II device 408) has completed.

Thereafter, the caller 120 and the supervisor 150 may engage in conversation. After their conversation is over, one or both of the callers (i.e., the caller 120 and/or the supervisor 150) will hang up. Once one of the callers hangs up, the third call C3 408 will end. As illustrated in FIG. 4, assuming the supervisor 150 hangs up first, the Target II device 406 (e.g., the supervisor's device 151) will send out a call end request to the third call C3 408, which is represented by the one-directional arrow 425. The third call C3 408 then ends the call and notifies the caller device 401 that the third call C3 408 has ended, which is represented by the one-directional arrow 426. Once the third call C3 408 is ended, global state of the shared call operation is changed from the active state 201 to the ended state 207. Accordingly, the third call C3 408 records the updated global state in the global store 407. In this situation, since the shared call operation is ended, the data related to the ended shared call operation is no longer needed, thus, the global store 407 may delete all the data related to this shared call operation, which is represented by the one-directional arrow 427. Thereafter, or substantially around the same time, the third call service also notifies the Target I device 403 and the Target II device 406 that the third call is ended, which is represented by the respective one-directional arrows 428 and 429.

There may be a situation in which the second call has ended before the third call C3 408 is fully established (e.g., the caller gets impatient and hangs up the call before the supervisor 150 picks up the call). In such a situation, here, since the third call C3 408 in the call service system 210 has access to the global state of the shared call operation in the global store 407, the third call C3 408 would not continue the unpark request if the global state indicates that the second call has ended. Unlike in the call service system 110, in a traditional call service system, the third call C3 408 and the second call C2 404 are treated as two independent calls, and they do not know each other's call state. Thus, even if the second call has ended prior to the unpark request, the third call C3 408 would not know that the second call has ended, and still will try to pass on the call replacement request to the second call C2 404. Thus, the principles described herein solves the above-mentioned potential problems in the traditional call service systems.

As described above, FIGS. 3 and 4 illustrate an example set of communications between multiple devices (e.g., the caller device 301 or 401, the Target I device 303 or 403, the call park service 305 or 405, the Target II device 306 or 406, the global store 307 or 407) and multiple related calls (e.g., the first call C1 302 or 402, the second call C2 304 or 404, and the third call C3 408) in the call service system 110. The call service system 110 treats the multiple related calls as a single shared call operation, such that the related calls are notified to the global state of the shared call operation and able to response to the global state change properly. The call transfer operation illustrated in FIG. 3 and the call replacement operation illustrated in FIG. 4 are merely two example operations that the system 110 may properly handle. There may be other operations between multiple devices and involving multiple related calls. Also, the global call states illustrated in FIG. 2 are also merely examples. Different call service systems may design a different set of global call states to handle customized operations and/or general operations.

The following discussion now refers to a number of methods and method acts that may be performed. Although the method acts may be discussed in a certain order or illustrated in a flowchart as occurring in a particular order, no particular ordering is required unless specifically stated, or required because an act is dependent on another act being completed prior to the act being performed.

Figure 5:
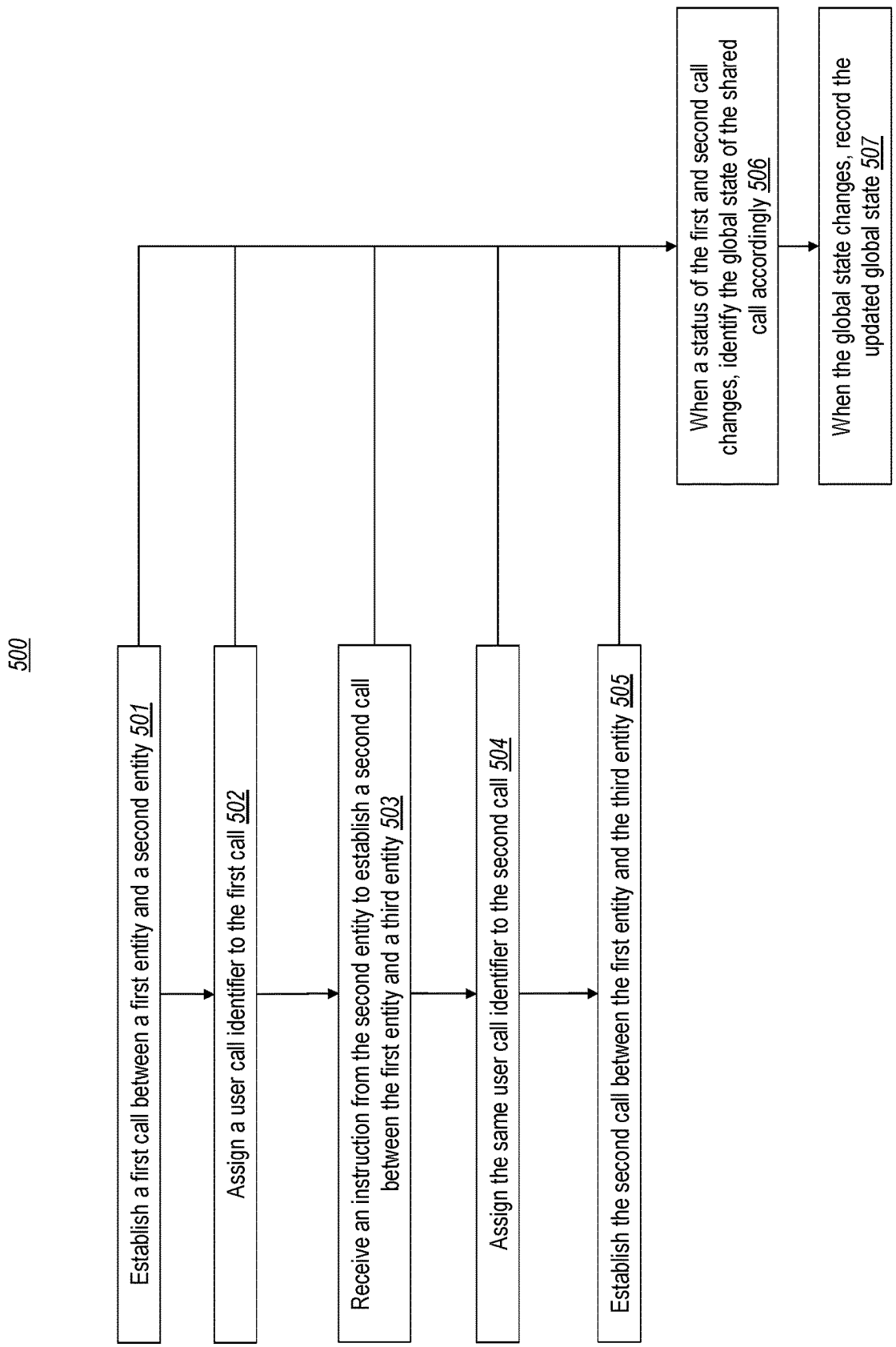
FIG. 5 illustrates a flowchart of an example method for transferring a first call to a second call.

FIG. 5 illustrates a flowchart of an example method 500 for transferring a first call to a second call in a call service system that records and shares global states of shared call operations, which may correspond to the call transfer operation described with respect to FIG. 3. The method 500 will thus now be described with frequent reference to FIG. 3 (and also FIGS. 1 and 2).

The method 500 includes establishing a first call between a first entity and a second entity (act 501). For instance, in FIG. 3, the first entity might be the caller device 301, the second entity might be the Target I device 303, and the first call might be the first call C1 302. Thus, the establishment of the first call C1 302 between the caller device 301 and the Target I device 303 is an example of the act 501 of FIG. 5.

Next, a user call identifier is assigned to the first call (act 502). For instance, as mentioned above with respect to FIG. 1, the user call identifier 115 was assigned to the first call 111. As a reminder, this user call identifier is a single identifier that is to be assigned to multiple related calls. Later, the global state related to the collection of multiple calls may be filed under that single user call identifier.

The method 500 also includes receiving an instruction from the second entity to establish a second call between the first entity and a third entity (act 503). For instance, in FIG. 3, the third entity might be the call park service 305, and the call transfer request sent from the Target I device 303 to the first call C1 302 (represented by the one-directional arrow 309) may be an example instruction received in the act 503.

Here, the same user call identifier that was assigned to the first call is now assigned to the second call (act 504). Accordingly, the first call and the second call now have the same user call identifier, and are included in a shared call operation. For instance, in FIG. 1, the call service system assigned the same user call identifier 115 to the first call 111, and to the second call 112. Also, as mentioned with respect to FIG. 3, the second call C2 304 was assigned the same user call identifier as the first call C1 302.

Thereafter, the second call between the first entity and the third entity is established (act 505). For instance, the act 505 of establishing the second call might include the various communications represented by 310 through 321 illustrated in FIG. 3. As previously mentioned, this results in the second call being established as represented by the black bi-directional arrow 322 in FIG. 3.

During one or more of the acts 501 through 505, the global state of the shared call operation may be identified based on a status of at least one of the first call (e.g., the first call C1 302) and the second call (e.g., the second call C2 304) (act 506). For example, in FIG. 3, the global state may be identified and recorded as the parking state 202 after the target I device 303 requested the call transfer (see arrow 309), and at the time the first call reserved a pickup code for the second call for the second call C2 304 (see arrow 310). Additionally, the global state may be identified and recorded as the park success pending confirmation state (see arrow 318) after the second call 304 sent the second call request (see arrow 316), and the call park service 305 accepted the second call request (see arrow 317). As another example, the global state may be identified and recorded as the parked state 206 (see arrow 321) after the second call 304 sent the second call request to the caller device 301, and the caller device 301 accepted the call request.

When the global state of the shared call operation changes, the updated global state may be recorded in the global store (act 507). For example, in FIG. 3, if the second call C2 304 sends the second call request to the call park service 305 (represented by arrow 316), and the call park service 305 fails to accept the second call request, the second call C2 304 fails. In such a situation, the second call C2 may send the same request again to the call park service 305. During the process of repeating the request, the global state of the shared call operation may remain the same (e.g., in the parking state 202). Therefore, there is no need to update the global state recorded in the global store. Alternatively, or after a few failed attempts, the call service system 110 may send the caller device 301 back to the Target I device 303. In this case, the global state of the shared call operation may be changed from the parking state 202 back to the call active state 201, and the updated global state (e.g., the call active state 201) may then be recorded in the global store.

The global store (e.g., the call state store 160 and/or the global store 307, 407) may record each of the updated global call state with the time at which the global state change occurs, and keep the sequence of the global call states in the record. Such an embodiment may allow the call service system 110 to better trouble shoot when an error occurs because the complete record of the shared call operation is stored and retrievable. Alternatively, the global store 160, 307, 407 may replace the existing record with the updated global state, such that the global store 160, 307, 407 only contain the most recent global state of the shared call operation. Such an embodiment requires less storage and may also speed up the process of recording and retrieving each global state of shared calls. Other embodiments may also be implemented to store partial global states of the shared calls. For example, certain states may be more important than others. Accordingly, the more important states may be stored, and the less important states may be overwritten by new states as they occur.

FIG. 5 merely illustrates an example of the call transfer operation. It is not limited that the second entity initiates the call transfer operation to transfer the first call to a second call between the first entity and the third entity. The principles described herein allows any entity involved in the shared call operation to initiate a call transfer operation. For example, the first entity may also initiate the call transfer operation to transfer the first call to a second call between the second entity and a third entity.

Figure 6:
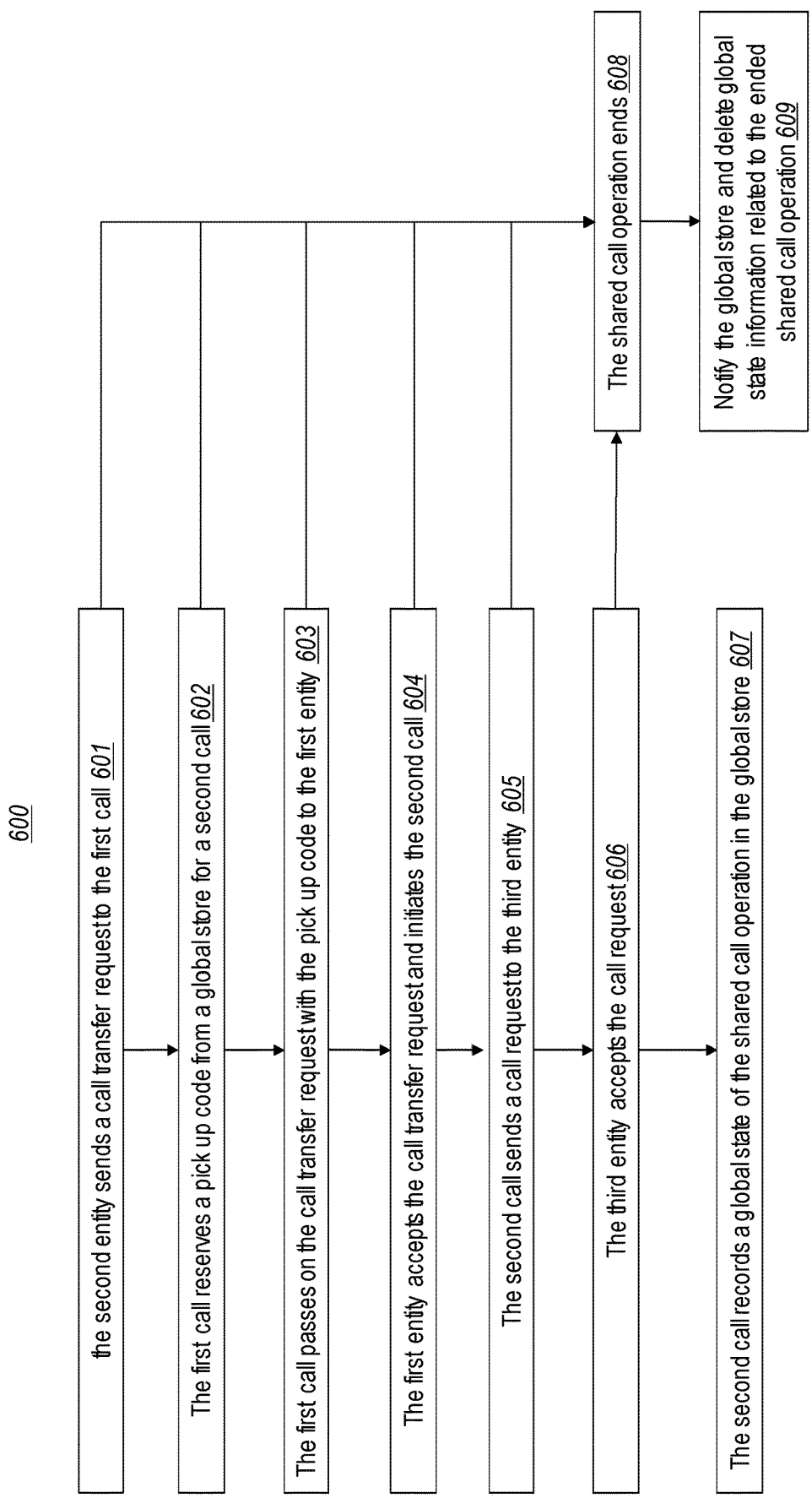
FIG. 6 illustrates a flowchart of an example method for establishing a second call of FIG. 5.

FIG. 6 illustrates a flowchart of an example method 600 for establishing the second call between the first entity and a third entity, which may correspond to the act 505 of FIG. 5. The method 600 includes that the second entity initiates the call transfer requests and sends the request to the first call (act 601). For instance, in FIG. 3, the call transfer request sent from the Target I device 303 to the first call C1 301 represented by arrow 309 may be an example of the act 601 of FIG. 6.

The first call then reserves a pickup code for a second call from a global store (act 602), and then passes on the call transfer request with the pickup code to the first entity (act 603). For instance, in FIG. 3, the reserving a pickup code for the second call represented by arrow 310 and represented by arrow 311 may be an example of the act 602 of FIG. 6. The call transfer request with the pickup code represented by arrow 311 may be an example of the act 603 of FIG. 6. The reason for reserving a pick up code in a global store is to ensure that two calls don't share the same pick up code within some context space. For example, calls within one shared call operation should not have the same pick up codes at any given time.

The first entity then accepts the call transfer request and initiates the second call (act 604). In FIG. 3, the second call invitation represented by arrow 314 may be an example of the act 604 of FIG. 6. Next, the second call sends a call request to the third entity (act 605), and the third entity may accept the call request (act 606). In FIG. 3, the second call request represented by arrow 316 may be an example of the act 605. In FIG. 3, the acceptance represented by arrow 317 may be an example of the act 606 of FIG. 6.

At this point, the second call (e.g., the second call C2 304) is established. The second call then records a global state of the shared call operation in the global store (act 607). In FIG. 3, the setting of the global state information represented by arrow 318 may be an example of act 607 of FIG. 6. Also, in FIG. 1, the global state 116 of the shared call operation is stored in the call state storage 160. Each of the first call 111, second call 112, and third call 113 has access to the global store 160, including setting the updated global state 116 and reading the previously recorded global state 116. For instance, in the act 607, the second call 112 sets and records the updated global state 161 in the call state store 160 (i.e., global store).

When each of the acts 601 through 606 is performed, the call transfer operation will be completed successfully. On the other hand, in some situation, each of the acts 601 through 606 may fail due to various reasons. A result of a failure within acts 601 through 606 may lead to the end of the shared call operation (act 608). Once the shared call operation ends, the global state of the shared call operation becomes the ended state 207, and the global store will be notified of the ended state 207. In such a situation, the global store may delete all the global state information related to the ended shared call operation (act 609).

For instance, in FIG. 1, the call service system 110 may be a computing system. Thus, there may be various issues arising when handling a large number of calls. As an example, the call service system 110's hardware or software may limit the total number of calls that may be handled simultaneously, and/or the computer network's bandwidth may also trigger a similar limitation. These limitations and imperfections may cause a call establishment to fail.

In some circumstances, when the call establishment fails, the shared call operation may transit to another call state or remain at the same state. For instance, in act 604, if the first entity fails to accept the call transfer request, or the network is so crowded that the call transfer acceptance sent by the first entity is lost by the delayed transmission, the call service system may cause the first call to sends the call transfer request again to the first entity (i.e., repeat the act 603). If after a few attempts, the acts 603 and 604 succeed, the second call will eventually be established successfully.

However, there may be a maximum number of times that the call service system would allow the repeated requests to be sent. Alternatively, or in addition, there may be a maximum time for a call request to time out. When the maximum number or time is reached, the call will end. Often, one call's end and failure will affect the global state of the whole shared call operation, and cause the global state of the shared call operation to change to the ended state 207. Once the global state of the shared call operation changes to the ended state 207, there is generally no need to keep the previous global state information in the global store anymore. The global store may then automatically delete such information from its storage. For instance, in FIG. 1, when the shared call operation ends, each of the related calls including the first call 111, the second call 112, and the third call 113 will end. Thus, in the call service system 110, there will no longer be any call with the user call identifier 115, and the global state 161 of the shared call will no longer be stored in the call state store 160 (e.g. global store).

Figure 7:
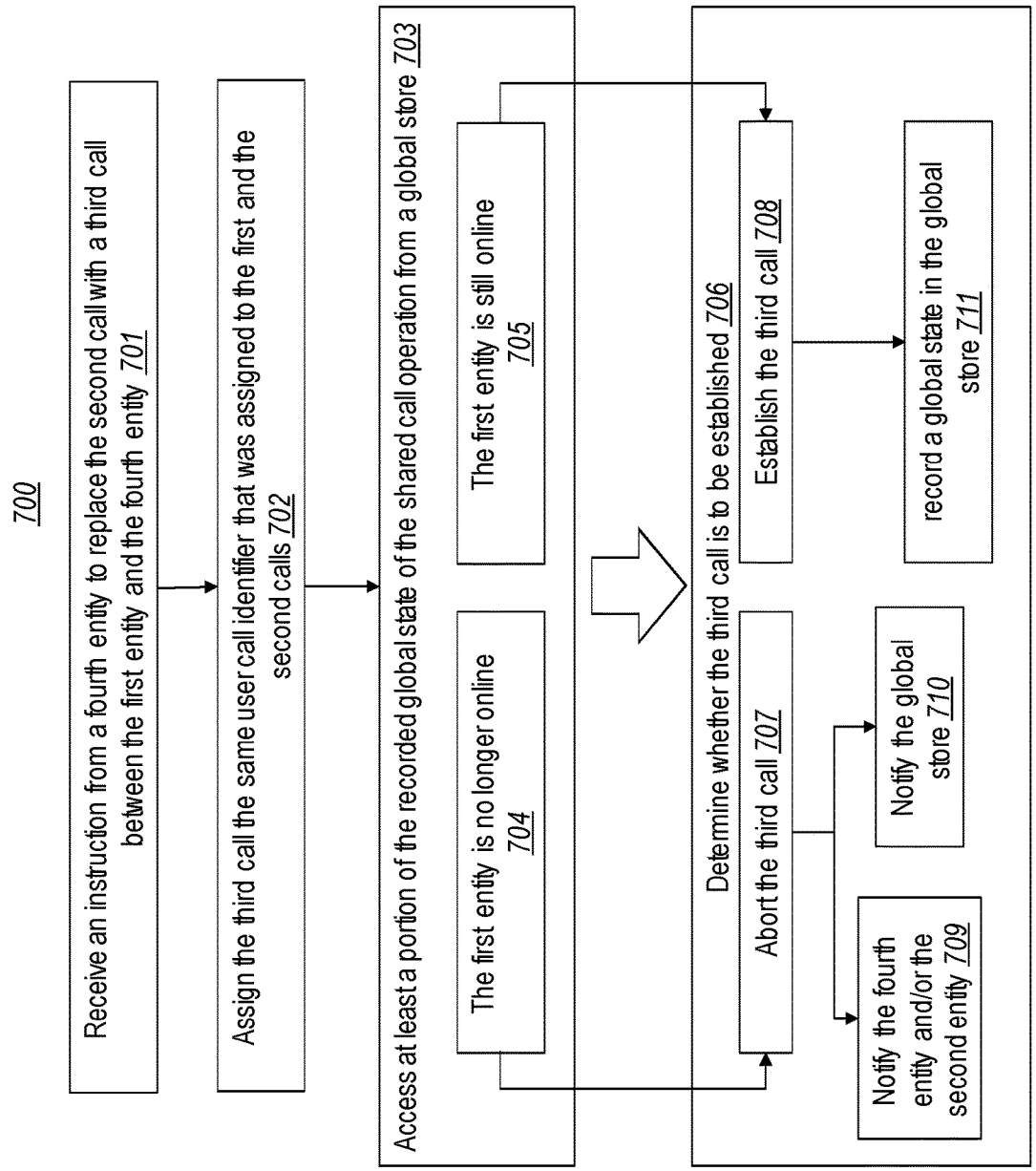
FIG. 7 illustrates a flowchart of an example method for replacing a second call by a third call.

FIG. 7 illustrates a flowchart of an example method 700 for replacing a second call by a third call in a call service system that shares global states of shared call operations, which may correspond to the call replacement operation described with respect to FIG. 4. The method 700 will thus now be described with frequent reference to FIG. 4 (and also FIGS. 1 and 2).

The method 700 includes receiving an instruction from a fourth entity to replace the second call with a third call (act 701). For instance, in FIG. 4, the fourth entity might be the Target II 406, the second call may be the second call C2 404, and the third call may be the third call C3 408. Thus, the unpark request represented by arrow 410 may be an example of the act 701 of FIG. 7.

Next, the same user call identifier that was assigned to the first call and the second call is assigned to the third call (act 702). Accordingly, the first call, the second call, and the third call now all have the same user call identifier, and are included in the same shared call operation. For instance, as mentioned above with respect to FIG. 1, the user call identifier 115 was assigned to each of the first call 111, the second call 112, and the third call 113. Also, as mentioned with respect to FIG. 4, the third call C3 408 was assigned the same user call identifier as the second call C2 404. As illustrated in FIG. 4, during the process of the call replacement operation, the second call C2 404 and the third call C3 408 may both be active calls in the call service system 110 for a brief period.

Next, the third call then accesses at least a portion of the recorded global state of the shared call operation from the global store (act 703). For instance, in FIG. 4, the communication of getting the global state information (represented by arrow 411) may be an example of the act 702 of FIG. 7. Also, as illustrated in FIG. 1, since the third call 113 was assigned the same user call identifier 115 as the first call 111 and the second call 112, once the call state store (i.e., the global store) 160 receives a request from the third call 113 for the global state information, the call state store 160 may identify the global state of the shared call operation that is associated with the user call identifier 115. The call state store 160 may then retrieve the recorded global state associated with the user call identifier 115 and send the retrieved global state information to the third call 113.

Thereafter, based on the accessed global state information, it is then determined whether the third call is to be established (act 706). For example, in FIG. 1, the accessed global state 161 may indicate that the caller 120 is no longer online (act 704). Accordingly, the retrieved global state may indicate that the global state of the shared call that is associated with the user call identifier 115 is in the ended state 207, and/or not in the parked state 206. If this is the case, the determination may be that the third call 113 should be aborted or not be established (act 707). Thereafter, the call service system 110 will abort the third call 113 and notify the call state store 160 that the third call 113 will not be established (act 710). Subsequently, or at substantially the same time, the call service system 110 may also notify the Target II device 151 and/or the Target I device 131 that the shared call operation has been ended, and the third call 113 will not be established (act 709). The call service system 110 may also notify the Target I and Target II devices 131 and 151 that the failed call replacement operation was caused by the ending of the second call 112 prior to the establishment of the third call 113.

On the other hand, the accessed global state may indicate that the first entity is still online (act 705). For example, in FIG. 1, the global state 161 retrieved from the call state store 160 may indicate that the global state of the shared operation associated with the user call identifier 115 is in the parked state 206, which is a valid state for performing a call replacement operation. In such a case, the determination should be that the third call 113 should be established. Thus, the third call 113 will be established (act 708). Also, as illustrated in FIG. 4, once a valid global state is received from the global store 307, multiple communications represented by arrows 412 through 416 may occur to finish establishing the third call C3 408.

Once the third call is established (act 708), the global state of the shared call operation may be changed from the parked state 206 to the call active state 201, and the updated global state (e.g., the parked state 206) will then be recorded in the global store (act 711). For example, in FIG. 1, the caller 120 used to be in the second call 112 with the call park service 140. After the third call 113 is established, the third call 113 will replace the second call 112, and the caller's device 121 will be connected to the Target II device 151. Because the caller 120 now is no longer in the holding pen, and is actively talking to the Target II 150, the global state of the shared call associated with the identifier 115 may transit from the parked state 206 to the call active state 201.

Thereafter, the updated global state (e.g., the active state 201) will then be recorded in the global store (act 711). Further, in FIG. 4, the setting the global call state represented by arrow 421 may be an example of the act 711 of FIG. 7.

Figure 8:
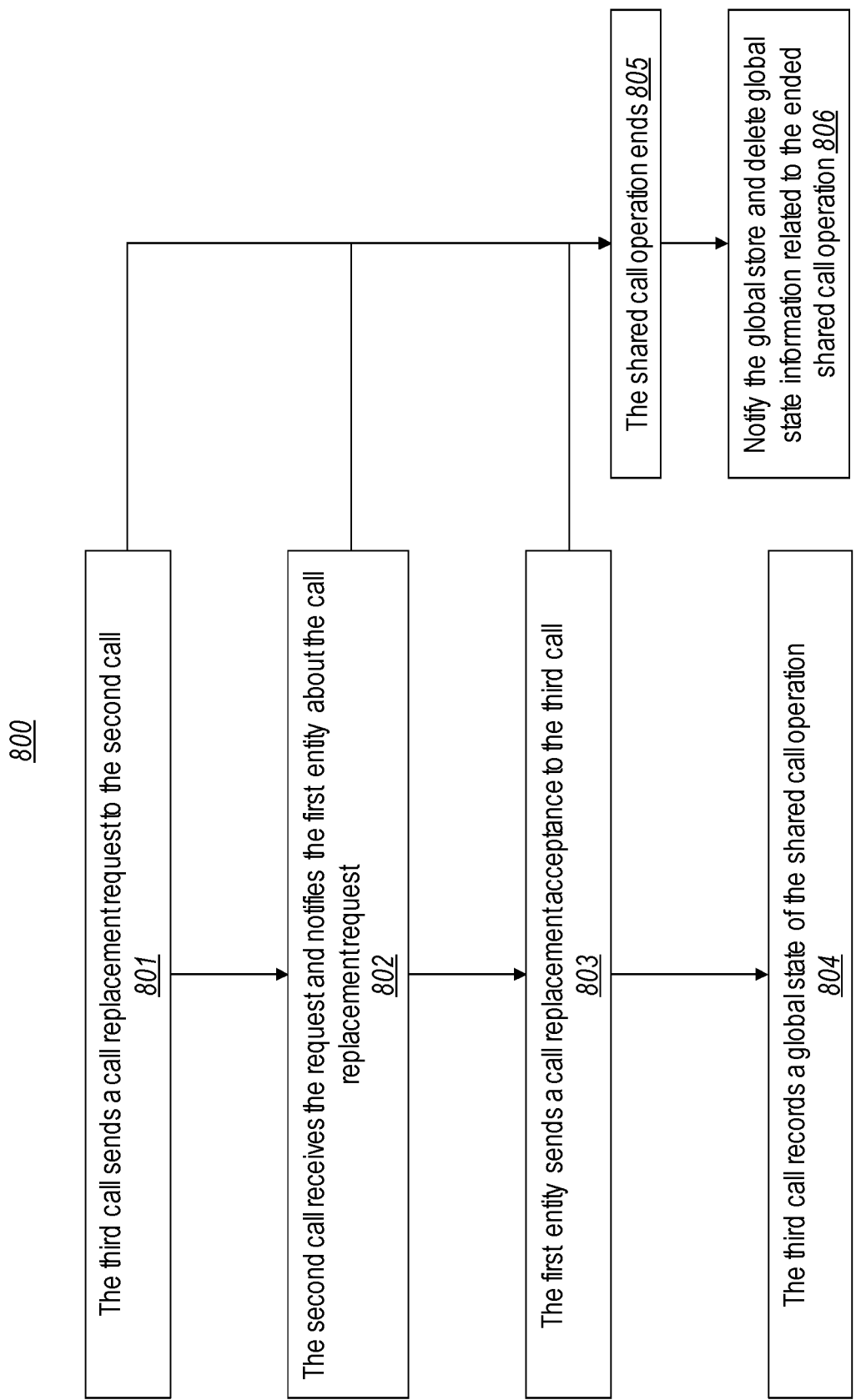
FIG. 8 illustrates a flowchart of an example method for establishing a third call between the first entity and the fourth entity.

Finally, FIG. 8 illustrates a flowchart of an example method 800 for establishing the third call between the first entity and the fourth entity, which may correspond to the act 708 of method 700. The method 800 includes that the third call sends a call replacement request to the second call (act 801). In FIG. 4, the call replacement request from the third call C3 408 to the second call C2 404 represented by arrow 412 may be an example of the act 801 of FIG. 8.

The second call then notifies the first entity about the call replacement request (act 802). In FIG. 4, the call replacement request notification sent from the second call 404 to the caller device 401 represented by arrow 413 may be an example of the act 802 of FIG. 8.

In response to the call replacement request, the first entity may then send a call replacement acceptance to the third call (act 803). In FIG. 4, the call acceptance sent from the caller device 401 to the third call C3 408 represented by arrow 414 may be an example of the act 803 of FIG. 8.

Now, the third call is established. Once the third call is established, the global state of the shared call operation may change from one state to another state, and the updated state of the shared call operation may then be recorded in the global store (act 804). For instance, in FIG. 4, the third call C3 408 setting the global call state (represented by the arrow 421) may be an example of act 804 of FIG. 8. Also, as discussed earlier with respect to FIG. 1, each of the first call 111, second call 112, and third call 113 can set the global state 161 of the shared call, and cause the updated global state 161 to be recorded in the call state storage 160. For instance, here, after the third call 113 is established, the third call 113 is the one that sets the global state 161 of the shared call in the call state storage 160. Once the global state 161 is updated, other related calls (e.g., the second call 112) can access the call state store 160 to check the updated state 161. Alternatively, the call state store 160 may automatically notify each of the other related calls (e.g., the second call 112), when the global state 161 has been updated by one of the related calls (e.g., the third call 113).

As illustrated in FIG. 8, when each of the acts 801 through 803 succeeds, the third call between the first entity and the fourth entity is established successfully. On the other hand, each of the acts 801 through 803 may fail. When at least one of the acts 801 through 803 fails, the shared call operation may end (act 805), which causes the global state of the shared call operation to change to the ended state. Thereafter, the global store will be notified such a change of state (act 806).

For instance, as briefly discussed with respect to FIG. 6, the call service system 110 of FIG. 1 may be a computing system. Thus, various issues may arise when handling a large number of calls. As an example, the call service system 110's hardware or software may limit the total number of calls that may be handled simultaneously, and/or the computer network's bandwidth may also trigger such a limitation. These limitations and imperfections may cause a call establishment to fail at any stage of the process.

In some circumstances, when the call establishment fails, the shared call operation may transit to another call state or remain at the same state. For instance, in act 803, if the first entity fails to send a call replacement acceptance to the third call, or the network is so crowded, such that the call replacement acceptance sent by the first entity is lost by the delayed transmission, the call service system may cause the second call sends the call replacement request again to the first entity, i.e., the acts 802 and 803 will repeat. If after a few attempts, the acts 802 and 803 succeed, the third call will eventually be established successfully.

However, similar to the situation described with respect to FIG. 6, when the maximum number of the repeated acts or the processing time limit is reached, the call will end. Often, one related call's end and failure will affect the global state of the whole shared call operation, and cause the global state of the shared call operation to change to the ended state. Once the global state of the shared call operation changes to the ended state 207, the global store should be notified, and the global state information related to the ended shared call operation may then be deleted or backed up.

For instance, in FIG. 4, when the third call ended, which is represented by arrows 425 and 426, the third call C3 408 instructed the global store to delete the operation data including the global state information related to the ended shared call operation, which is represented by the arrow 427. Even though, in FIG. 4, the ended shared call operation was likely caused by the ending of the conversation between the two callers, a similar process may occur when the third call C3 408 is ended prematurely.

As discussed above, the principles described herein provide a technical advance to handling related calls (i.e., constituent calls). The related calls are assigned to a shared call state, such that when one call's status changes, the shared call state may change, and other related calls, callers, and/or caller devices are notified of such changes. This solves the problem of existing call service systems, in which a party in one of the related calls often does not know the state of the other related calls and/or devices.

Finally, the principles described herein may be performed in the context of a computing system. For example, the call service system 110 may be a computing system. Each of the entities and/or devices (including, but not limited to, the caller device 121, 301, 401, the Target I device 131, 303, 403, the Target II device 151, 306, 406, the call park service 140, 305, 405, and the call state store 160, 307 or 407) may also be a computing system. Further, each of the methods 500 to 800 may also be implemented in a computing system. As such, some introductory discussion of a computing system will be described with respect to FIG. 9.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
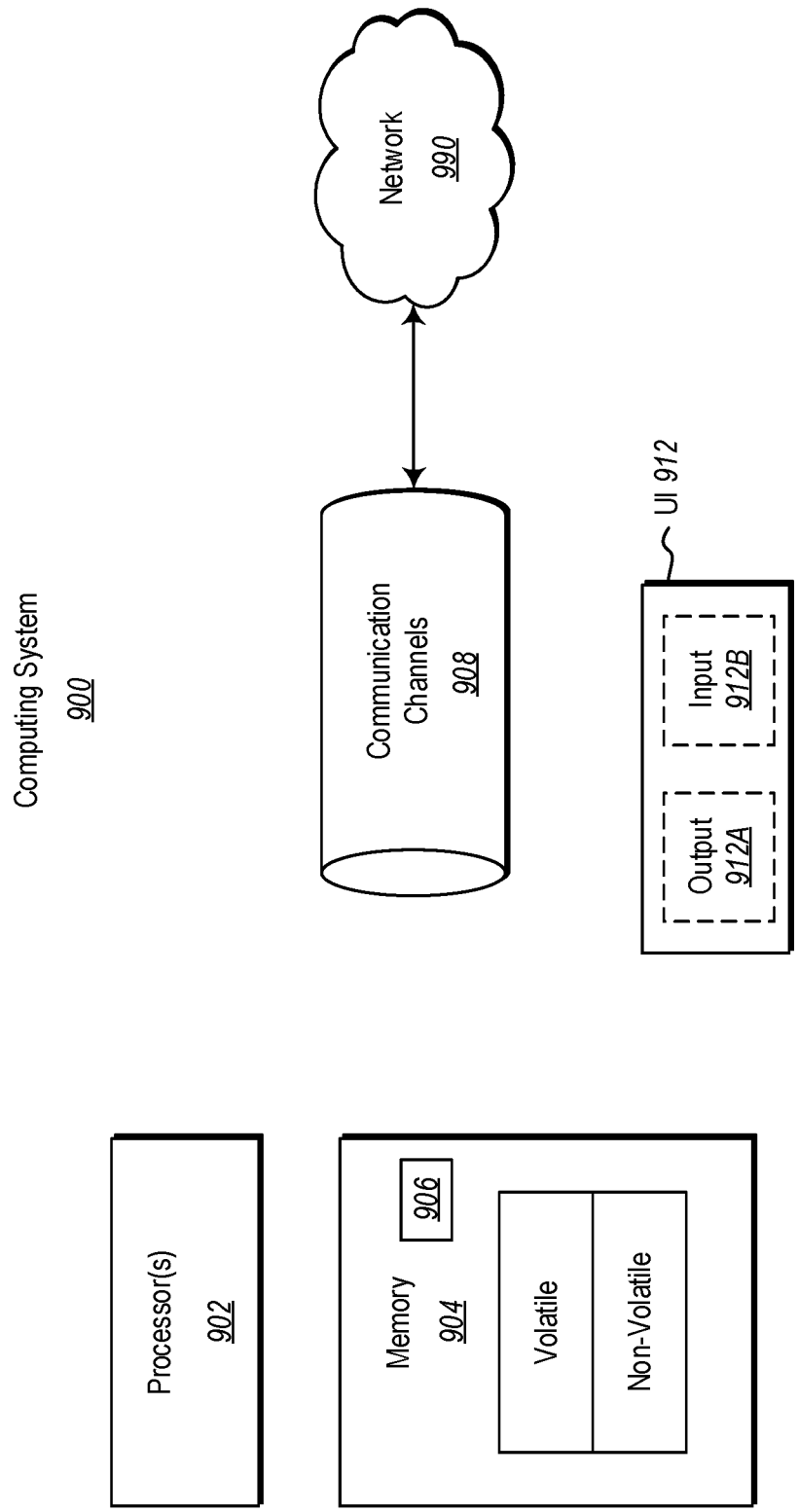
FIG. 9 illustrates an example computing system in which the principles described herein may be employed.

As illustrated in FIG. 9, in its most basic configuration, a computing system 900 typically includes at least one hardware processing unit 902 and memory 904. The processing unit 902 may include a general purpose processor and may also include a field programmable gate array (FPGA), an application specific integrated circuit (ASIC), or any other specialized circuit. The memory 904 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 900 also has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, holograms and so forth. Examples of input mechanisms 912B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 900 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 902 and memory 904, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are executable by the one or more processors to cause the computing system to:
   establish a first call between a first entity and a second entity;
   assign a user call identifier to the first call;
   receive an instruction from the second entity to establish a second call between the first entity and a third entity;
   establish the second call between the first entity and the third entity in response to the instruction from the second entity;
   assign the same user call identifier that was assigned to the first call to the second call, such that the first call and the second call are both included in a shared call operation;
   identify a first global state of the shared call operation based on a distributed status that is dependent on statuses of the first call and the second call such that the first global state of the shared call operation is determined based on separate and distributed statuses of each of the first call and the second call; and
   when the distributed status, which is based on the separate and distributed statuses of each of the first call and the second call, changes, update the first global state of the shared call operation from the first global state to a second global state.

2. The computing system of claim 1, the third entity being a call park service.

3. The computing system of claim 1, the user call identifier and the global state of the shared call operation is recorded in a store that is accessible by each of the first and second calls.

4. The computing system of claim 1, wherein establishing the second call between the first entity and the third entity further comprises the following steps:
   the second entity sends a call transfer request to the first call;
   in response to the call transfer request, the first call passes on the call transfer request with the pick up code to the first entity;
   when the first entity accepts the call transfer request and initiates the second call, the second call sends a call request to the third entity; and
   when the third entity accepts the call request from the third entity, the second call records a global state of the shared call operation in the global store.

5. The computing system of claim 1, wherein in response to the establishment of the second call, the first call receives a call transfer completion notification, and
   in response to the call transfer completion notification, the first call ends automatically, and the global state of the shared call operation changes from an existing global state to a new global state.

6. The computing system of claim 1, wherein in response to the establishment of the second call, the second call sends a notification to the second entity who instructed to establish the second call.

7. The computing system of claim 1, the computing system is further caused to:
   receive an instruction from a fourth entity to replace the second call with a third call, the third call being a call between the first entity and the fourth entity;
   assign the third call the same user call identifier that was assigned to the first and the second calls, such that the third call is included in the shared call operation;
   access at least a portion of the recorded global state information of the shared call operation;
   based on the accessed global state information, determine whether the third call is to be established.

8. The computing system of claim 7, wherein the fourth entity is related to the second entity.

9. The computing system of claim 7, wherein when the accessed global state information of the shared call operation indicates that the first entity is no longer online, the computing system is further caused to determine that the third call is not to be established,
   in response to the determination, abort the third call and notifying the fourth entity that the third call will not be established; and
   update the global state of the shared call operation to an ended state.

10. The computing system of claim 7, wherein when the accessed global state of the shared call operation indicates that the first entity is still online, the computing system is further caused to determine that the third call is to be established, in response to the determination, establish the third call between the first entity and the fourth entity, and update the global state of the shared call operation from an existing global state to a new global state.

11. The computing system of claim 10, the computing system is further caused to:

in response to the establishment of the third call, end the second call.

12. The computing system of claim 10, wherein the establishing of the third call comprising:

the third call sending a call replacement request to the second call;

the second call notifying the first entity about the call replacement request;

the first entity sending a call replacement acceptance to the third call; and when the third call is established, the third call updating the global state of the shared call operation.

13. The computing system of claim 1, wherein the global state comprises at least one of whether or not the corresponding shared call operation is active, and whether or not the corresponding shared call operation is parked.

14. The computing system of claim 1, wherein establishing the second call between the first entity and the third entity further comprises the following steps:

the second entity sends a call transfer request to the first call;

in response to the call transfer request, the first call passes on the call transfer request with the pick up code to the first entity;

when the first entity accepts the call transfer request and initiates the second call, the second call sends a call request to the third entity; and when the third entity accepts the call request from the third entity, the second call records a global state of the shared call operation in the global store.

15. A method for handling related calls using a global state of a shared call operation that includes multiple related calls, the method comprising:

establishing a first call between a first entity and a second entity;

assigning a user call identifier to the first call;

receiving an instruction from the second entity to establish a second call between the first entity and a third entity;

establishing the second call between the first entity and the third entity in response to the instruction from the second entity, wherein establishing the second call between the first entity and the third entity includes:

the second entity sends a call transfer request to the first call;

in response to the call transfer request, the first call reserves a pick up code from a global store for the second call and passes on the call transfer request with the pick up code to the first entity;

when the first entity accepts the call transfer request and initiates the second call, the second call sends a call request to the third entity; and when the third entity accepts the call request from the third entity, the second call records a global state of the shared call operation in the global store;

assigning the same user call identifier that was assigned to the first call to the second call, such that the first call and the second call are both included in a shared call operation;

identifying a first global state of the shared call operation based on a status of at least one of the first call and the second call; and when the status of the at least one of the first call and the second call changes, updating the global state of the shared call operation from the first global state to a second global state.

16. The method of 15, the method further comprising:

in response to the establishment of the second call, the first call receiving a call transfer completion notification, and in response to the call transfer completion notification, the first call ends automatically, and the global state of the shared call operation changing from an existing global state to a new global state.

17. The method of 15, the method further comprising:

receiving an instruction from a fourth entity to replace the second call with a third call, the third call being a call between the first entity and the fourth entity;

assigning the third call the same user call identifier that was assigned to the first and the second calls, such that the third call is included in the shared call operation;

accessing at least a portion of the recorded global state information of the shared call operation;

based on the accessed global state information, determining whether the third call is to be established.

18. The method of 17, the method further comprising:

when the accessed global state information of the shared call operation indicates that the first entity is no longer online, determining that the third call is not to be established, in response to the determination, aborting the third call and notifying the fourth entity that the third call will not be established; and updating the global state of the shared call operation to an ended state.

19. The method of 17, the method further comprising:

when the global state of the shared call operation indicates that the first entity is still online, determining the third call is to be established, in response to the determination, establishing the third call between the first entity and the fourth entity, and updating the global state of the shared call operation from an existing global state to a new global state.

20. The method of 19, the method further comprising:

in response to the establishment of the third call, ending the second call.

21. One or more hardware storage devices that store instructions that are executable by one or more processors of a computing system to cause the computing system to at least:

establish a first call between a first entity and a second entity;

assign a user call identifier to the first call;

receive an instruction from the second entity to establish a second call between the first entity and a third entity;

establish the second call between the first entity and the third entity in response to the instruction from the second entity, wherein establishing the second call between the first entity and the third entity includes:

the second entity sends a call transfer request to the first call;

in response to the call transfer request, the first call reserves a pick up code from a global store for the second call and passes on the call transfer request with the pick up code to the first entity;

when the first entity accepts the call transfer request and initiates the second call, the second call sends a call request to the third entity; and when the third entity accepts the call request from the third entity, the second call records a global state of the shared call operation in the global store;

assign the same user call identifier that was assigned to the first call to the second call, such that the first call and the second call are both included in a shared call operation;

identify a first global state of the shared call operation based on a status of at least one of the first call and the second call; and when the status of at least one of the first call and the second call changes, update the global state of the shared call operation from the first global state to the second global state.

22. A computing system comprising:

one or more processors; and one or more computer-readable media having thereon computer-executable instructions that are executable by the one or more processors to cause the computing system to:

establish a first call between a first entity and a second entity;

assign a user call identifier to the first call;

receive an instruction from the second entity to establish a second call between the first entity and a third entity;

causing the first call to (i) reserve, from a global store, a pick up code that will be used for the second call when the second call is established and (ii) pass the reserved pick up code to the first entity;

establish the second call between the first entity and the third entity in response to the instruction from the second entity;

assign the same user call identifier that was assigned to the first call to the second call, such that the first call and the second call are both included in a shared call operation, wherein reserving the pick up code for the second call ensures that calls included in the same shared call operation, which includes the first call and the second call, do not have the same pick up codes at any given time;

identify a first global state of the shared call operation based on a status of at least one of the first call and the second call; and when the status of the at least one of the first call and the second call changes, update the global state of the shared call operation from the first global state to a second global state.

* * * * *